S. J. ROSS, DEC'D.
H. SCHOFIELD, EXECUTOR.
LOCK NUT.
APPLICATION FILED MAY 25, 1917.
1,275,182.
Patented Aug. 6, 1918.
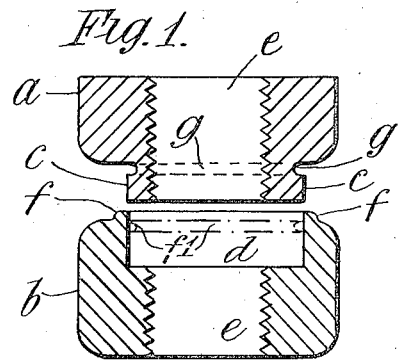
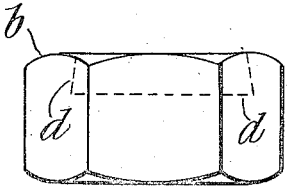
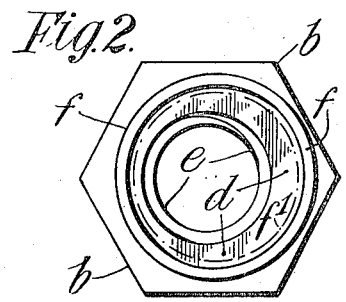
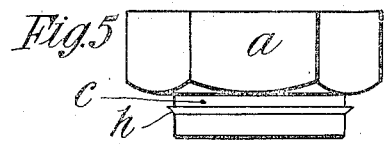
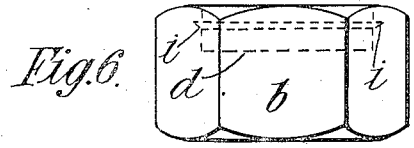
Inventor
Sidney John Ross.
per
C. Barnard Burdon.
Attorney.

UNITED STATES PATENT OFFICE.

SIDNEY JOHN ROSS, OF LONDON, ENGLAND; HARRY SCHOFIELD EXECUTOR OF SAID SIDNEY JOHN ROSS, DECEASED.

LOCK-NUT.

1,275,182.  Specification of Letters Patent.  Patented Aug. 6, 1918.

Application filed May 25, 1917. Serial No. 170,890.

*To all whom it may concern:*

Be it known that I, SIDNEY JOHN ROSS, a subject of the King of Great Britain, residing at 117 and 118 Leadenhall street, London, E. C. 3, England, engineer, have invented certain new and useful Improvements in or Relating to Lock-Nuts, of which the following is a specification.

This invention relates to lock-nut arrangements.

According to the invention, two nuts have eccentric parts which not only serve for producing the locking action when on a screw-bolt, but also overlap into, or engage each other and prevent the nuts coming apart, as they might do when unscrewed from the bolt.

Hence a pair of such nuts form one single and practically inseparable unit or locking-device, and are always coupled together ready for immediate use.

For connecting the two nuts, an eccentric part or parts of one may be made to project or overlap into an eccentric cavity or undercut recess in the other. This may be done in various ways (as hereinafter referred to) but the connection or "keying together" is not so tight however, as to prevent one nut turning relatively to the other. Moreover the connecting or keying means does not involve weakening the wall of the socket, which is in most cases straight and without taper, or has only a very slight taper.

The two nuts together can be easily screwed into position on a bolt, by turning them simultaneously as though they were one single nut, and then the eccentric locking or jamming action can be set up instantly by giving one a partial turn in either direction relatively to the other.

In the drawings:—

Figure 1 is a transverse section of the two parts or nuts of one example of eccentric lock nut device such as referred to, which can be made to engage or key into each other by pressing them together.

Fig. 2 is a plan of the lower part or female nut shown in Fig. 1.

Figs. 3 and 4 are elevations of two such nuts having tapered eccentric parts, which can for instance, be keyed or connected by making one of them red hot and slipping it on to the other.

Figs. 5 and 6 are corresponding views showing another keying arrangement.

Referring more particularly to Figs. 1 and 2:—*a* and *b* are respectively the two parts or nuts of the locking device, the former having an eccentric spigot or plug portion *c*, which fits into an eccentric socket or cavity *d* in the known way. The ordinary central screw-threaded eye or bolt-hole is indicated at *e*.

A raised rim or ridge *f* is provided around the mouth of the cavity *d*, and the plug *o* is provided with a corresponding groove or contraction at *g*.

Thus when the two nuts are placed together, and squeezed by a hydraulic press for instance, the rim or ridge *f* will be flattened and the inner edge of the socket or cavity *d* will be bulged inward as shown at $f^1$ in dotted lines, so as to project into the groove *g*, and while not actually gripping the plug tightly, or interfering with its turning in the cavity, will yet key it therein and prevent it being withdrawn therefrom. This moreover involves no weakening of the wall of the socket which is straight and without taper.

To insure that the screw-threads of the nuts match properly, the nuts may be provided with indicator marks on two or more of their sides or faces. When these marks are brought together, the nuts are in proper relationship for working together or screwing into position on a bolt as easily as a single ordinary nut. After this a slight turn of one nut relatively to the other in either direction (preferably the forward direction) causes the two nuts to lock on the screw bolt, owing to the twisting action due to the eccentricity seen in Fig. 2.

In a further example, the plug *c* may be dovetailed or undercut around its edge, and one or more small knobs or swellings may be made in the socket *d* after the parts are put together. Such swellings may be obtained simply by making projections on top of the mouth of the cavity, instead of a complete annular ridge such as *f*, (Fig. 1), and then flattening them down.

According to the example shown in Figs. 3 and 4, the plug is tapered and of such diameter that it only enters the socket *d* when the nut *b* is expanded, for instance made red hot. Hence when the nut *b* cools down and contracts, the plug is unable to come out, although it can turn enough to set up the eccentric locking action. The taper in this case of course need only be very slight.

In the example shown in Figs. 5 and 6, *g* is a bur or ridge which is adapted to spring or grip into the recess *i* when the two nuts are forced together.

Moreover the projection or plug *c* on the nut *a* may (after insertion) be pressed out radially in any convenient way. This may be done by putting the nut *a* in red hot, its plug being a little deeper than the cavity, so that by pressing the nuts down on to each other, the plug will be bulged outwardly and engage or key into the undercut part, which being cold will serve as a kind of mold therefor. Any bulging into the central hole or eye of the nut would be removed when screw-threading the latter.

I claim:—

1. A lock-nut having eccentric locking parts, which are held together by keying means on one, engaging an annular groove in the other, substantially as described.

2. A lock-nut comprising two nuts forming a single unit and having eccentric plug- and-socket locking parts on one of which is a bead or ridge projecting into a groove in the other, to prevent them coming apart, while however permitting the necessary relative turning to give the eccentric locking action in either direction, substantially as described.

3. A lock-nut having a socket in one nut to receive a spigot in the other nut, the walls of such spigot and socket being without taper, and a bead or ridge around the edge of the socket engaging a groove or channel around the spigot, substantially as described.

In testimony whereof I have signed this specification.

SIDNEY JOHN ROSS.